Nov. 6, 1923.
W. R. LINDSTROM
1,473,437
DETACHABLE GUIDE OR TIP FOR FISHING RODS
Filed Sept. 2, 1922
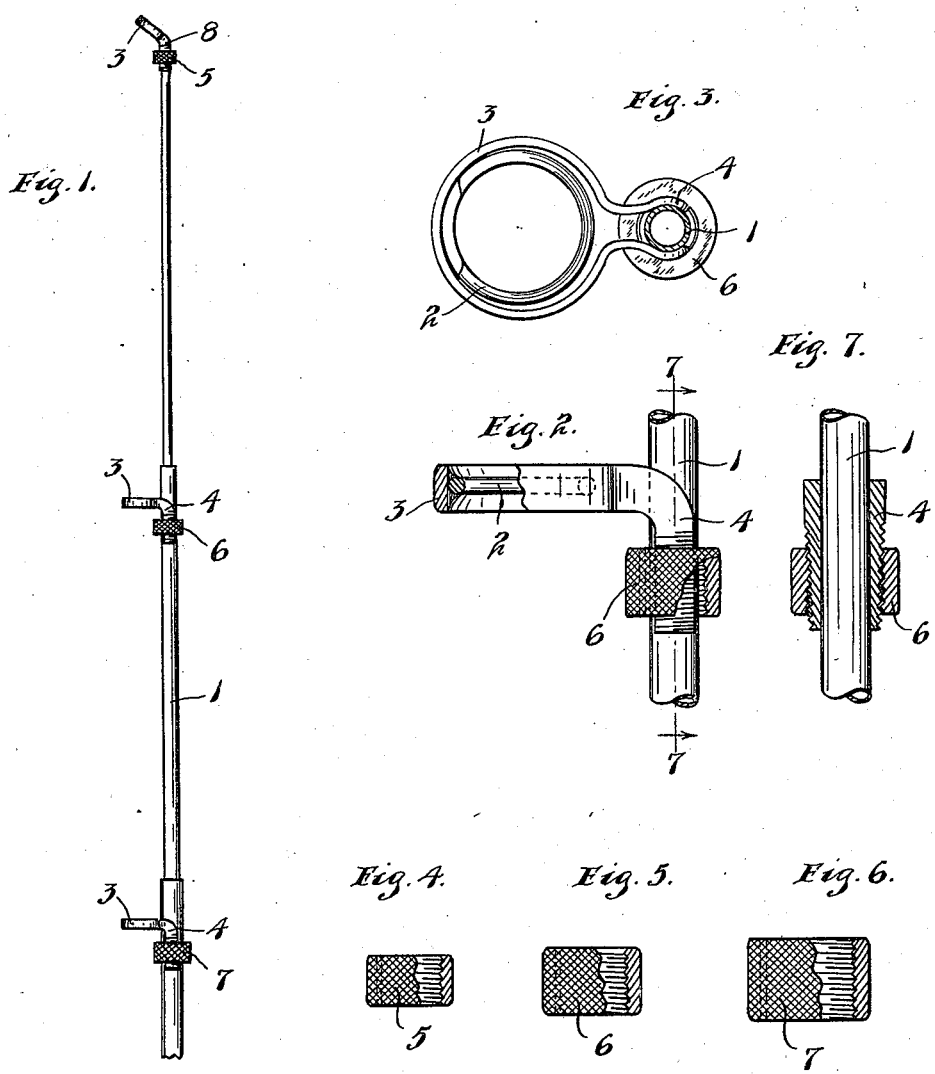
INVENTOR.
WALTER R. LINDSTROM
BY HIS ATTORNEY.
James F. Williamson Patented Nov. 6, 1923.

1,473,437

UNITED STATES PATENT OFFICE.

WALTER R. LINDSTROM, OF MINNEAPOLIS, MINNESOTA, ASSIGNOR OF ONE-THIRD TO EUGENE C. McKENNA, OF MINNEAPOLIS, MINNESOTA.

DETACHABLE GUIDE OR TIP FOR FISHING RODS.

Application filed September 2, 1922. Serial No. 585,996.

*To all whom it may concern:*

Be it known that I, WALTER R. LINDSTROM, a citizen of the United States, residing at Minneapolis, in the county of Hennepin and State of Minnesota, have invented certain new and useful Improvements in Detachable Guides or Tips for Fishing Rods; and I do hereby declare the following to be a full, clear, and exact description of the invention, such as will enable others skilled in the art to which it appertains to make and use the same.

This invention relates to a fishing rod and particularly to a detachable guide or tip therefor. It is well known to the users of fishing apparatus that the guide or tip of the rod is sometimes broken or injured, thus seriously interfering with the proper and effective use of the apparatus. The said tips or guides are especially on metal rods securely attached to the rod and it has heretofore been impossible to quickly and easily replace the injured tip or guide. Even on bamboo, or other wooden fishing rods, it is a long and difficult task to properly attach a guide.

It is an object of this invention, therefore, to provide a guide or tip which can be easily and quickly applied to the rod when desired.

It is a further object of the invention to provide such a device comprising spaced arms embracing the rod and which can be clamped to the same in various positions thereon and to varying diameters thereof.

These and other objects and advantages of the invention will be fully set forth in the following description made in the connection with the accompanying drawings in which like reference characters refer to the same parts throughout the different views and in which, Fig. 1 is a view in elevation of a portion of a fishing rod showing the device of the invention applied thereto;

Fig. 2 is a view in side elevation, partly in section showing a portion of the rod with one of the devices attached thereto and shown on an enlarged scale;

Fig. 3 is a top plan view of Fig. 2; and

Figs. 4, 5 and 6 are views in elevation, partially in section of different size clamping members used; and Fig. 7 is a vertical section taken on line 7—7 of Fig. 2.

Referring to the drawing, a rod 1 is illustrated shown as of the type comprising joints or sections of different diameters. In accordance with the present invention, the device is formed comprising the ring or annular member 2 which may be formed of wire or circular cross section as shown, or which may be composed of agate or other material commonly used for such devices. The member 2 is embraced by and secured to the member 3, which member extends from the side thereof and has its ends formed as spaced arms 4 having their inner sides concave and formed to fit the sides of the rod 1. The outer sides of the arms 4 are threaded and adapted to receive one of a plurality of threaded sleeves 5, 6 and 7 shown in Figs. 4 to 6, which sleeves are preferably knurled or otherwise roughened on their exterior surfaces. It will be noted that the arms 4 have their center lines extending at an angle to the plane of the annular member 2 and that the center line passing between these arms passes outside of said annular member 2. It will also be noted from Fig. 7 that the outer sides of the arms 4 taper toward their ends so that when one of the knurled sleeves is screwed thereon, the arms will be moved toward each other or contracted.

When the device is used to form one of the guides which are disposed along the side of rod 1, the arms 4 will extend substantially at a right angle to the plane of the annular member 2. When the device is constructed to be used as a tip for the rod, the arms 4 will extend at an obtuse angle to the plane of the annular member 2 as clearly shown at 8 in Fig. 1.

In use, when it is desired to apply a guide to the rod, the arms 4 are placed on each side thereof as shown in Figs. 2 and 3 and a sleeve member screwed onto the ends of arms 4. The arms 4 will thus be contracted and made to tightly clamp the rod. If the guide is placed on the part of the rod having a small diameter, one of the smaller sleeves will be used, and, if the diameter is larger, one of the larger sleeves will be used. The guide can thus be clamped along any portion of the rod desired. The guide used as a tip, as shown in Fig. 1 will be similarly placed on the rod. The sleeves can be sufficiently tightened with the fingers to firmly and securely hold the guides in position.

From the above description, it is seen that applicant has provided an extremely simple and a very efficient detachable guide or tip. Such guides will have great utility as emergency guides when one of the regular guides on the fishing rod is broken off or injured. While the guide is designed primarily for emergency use, it will be obvious that the structure forms a simple and neat guide attachment which can be used on the rods as originally made and marketed. The guides will, of course, be made of the proper size to suit steel or wooden rods and it is within the scope of the invention to use such a guide for a cut rod or one made from the limb or trunk of a tree. A fishing rod can thus be quickly constructed and it will be only necessary to carry two or three of the guides in the fishing outfit.

It will, of course, be understood that various changes may be made in the form, details and proportions of the device without departing from the scope of applicant's invention, which generally stated consists in the manner shown and described and set forth in the appended claims.

What is claimed is:

1. A detachable guide or tip device for a fishing rod comprising an annular member, spaced means longitudinally tapered secured thereto formed to fit said rod and a clamping means movable longitudinally of the rod and said spaced means for moving said means together to secure the same to the rod.

2. A device of the class described comprising a guide ring, a member embracing and secured to the same, having laterally extended, tapered and exteriorly threaded arms, said arms being concave on their inner surfaces to fit along the sides of a fishing rod and a threaded sleeve adapted to be screwed onto said arms to clamp the same on said rod.

3. A device of the class described having in combination, an annular guide member, means secured thereto comprising spaced arms extending at an angle to the plane of said annular guide member, said arms being formed to embrace the sides of a fishing rod and being exteriorly tapered and threaded and adapted to receive one of a plurality of interiorly threaded sleeves.

In testimony whereof I affix my signature.

WALTER R. LINDSTROM.